United States Patent
Gambardella (10) Patent No.: US 11,112,123 B2
(45) Date of Patent: *Sep. 7, 2021

(54) FOOD COOKING OVEN

(71) Applicant: WHIRLPOOL EMEA S.P.A., Pero (IT)

(72) Inventor: Fabio Gambardella, Catanzaro Lido (IT)

(73) Assignee: WHIRLPOOL EMEA S.P.A., Pero (IT)

( * ) Notice: Subject to any disclaimer, the term of this patent is extended or adjusted under 35 U.S.C. 154(b) by 125 days.

This patent is subject to a terminal disclaimer.

(21) Appl. No.: 16/297,104

(22) Filed: Mar. 8, 2019

(65) Prior Publication Data

US 2019/0203948 A1     Jul. 4, 2019

Related U.S. Application Data

(63) Continuation of application No. 14/653,371, filed as application No. PCT/IB2013/061172 on Dec. 20, 2013, now Pat. No. 10,274,204.

(30) Foreign Application Priority Data

Dec. 20, 2012 (IT) .................. PR2012A000085

(51) Int. Cl.
| | |
|---|---|
| *F24C 15/04* | (2006.01) |
| *A47B 96/00* | (2006.01) |
| *B60J 1/18* | (2006.01) |
| *E06B 3/72* | (2006.01) |

(52) U.S. Cl.
CPC ............ *F24C 15/045* (2013.01); *A47B 96/00* (2013.01); *B60J 1/1846* (2013.01); *E06B 3/72* (2013.01); *Y10T 29/49945* (2015.01)

(58) Field of Classification Search
CPC . F24C 15/045; Y10T 29/49945; B60J 1/1846; E06B 3/72; A47B 96/00
See application file for complete search history.

(56) References Cited

U.S. PATENT DOCUMENTS

| | | | |
|---|---|---|---|
| 5,984,381 A | 11/1999 | Yamagishi | |
| 7,661,971 B1 | 2/2010 | Abe | |
| 10,274,204 B2 * | 4/2019 | Gambardella | ........ F24C 15/045 |
| 2013/0049559 A1 | 2/2013 | Koitzsch et al. | |

FOREIGN PATENT DOCUMENTS

| | | |
|---|---|---|
| EP | 2386800 | 11/2011 |
| WO | WO2009116094 | 9/2009 |
| WO | 2011120678 | 10/2011 |

* cited by examiner

*Primary Examiner* — John C Hong
(74) *Attorney, Agent, or Firm* — Price Heneveld LLP (57) ABSTRACT

A food cooking oven having an enclosure, which defines a cooking compartment and a door, which is movable between an open position and a closed position, is disclosed. The door may include a first panel, a second panel, which in a closed configuration has a greater distance from the compartment than the first panel. Additionally, a first and a second body for supporting the first and second panels is included. A profile is included, which is movable between a first position retaining the first panel and a second position permitting removal of the first panel from the door. A push-push type connector is included to retain the profile to the door.

14 Claims, 5 Drawing Sheets

FOOD COOKING OVEN

CROSS-REFERENCE TO RELATED APPLICATION

The present application is a continuation of U.S. patent application Ser. No. 14/653,371 filed Jun. 18, 2015, entitled FOOD COOKING OVEN, which is a national stage entry of International Application No. PCT/IB2013/061172 filed Dec. 20, 2013, entitled FOOD COOKING OVEN, which claims priority to Italian Application No. PR2012A000085 filed Dec. 20, 2012, the entire disclosures of which are hereby incorporated herein by reference.

TECHNICAL FIELD

The present invention relates to door for a cooking food oven.

STATE OF THE ART

It is known a cooking oven comprising a cooking compartment and one door. The door includes a first and a second glass panel.

In the configuration of a closed door, the first glass panel delimits the cooking compartment while the second glass panel is directly accessible from the outside. The first and second panels are placed side by side and parallel in such a way as to create at least a gap for the passage of fluid flow. This arrangement helps to reduce the risk that a user may be burnt by touching the second panel of the door and at the same time allows the use of transparent glasses, that allow a user to look inside the cooking compartment.

In order to carry out cleaning and maintenance interventions, at least the first glass panel is removable.

In this regard, this oven comprises locking means provided with protrusions which may be rotated between a first position in which they hold the first panel and a second position in which they release the first panel. To move said protrusion from the first to the second position or vice versa, it is necessary to rotate a pivot which is integral to the protrusion. In this regard a screwdriver or another tool may be used to rotate a slot properly formed in the pivot.

A drawback of such a constructive solution is that, in order to easily move the protrusion from the first to the second position the user must open the door completely and also must use helping tools.

SUMMARY

In this context, the technical object at the base of the present invention is to propose an oven for cooking food that overcomes the drawbacks of the prior art mentioned above. In particular, it is the aim of the present invention to provide an oven for cooking food that allows an easier mounting and removing of some components of the oven (typically of the glass panel closest to the cooking compartment).

The specified technical object and the specified aims are substantially achieved by an oven for cooking food, comprising the technical characteristics described in one or more of the attached claims.

BRIEF DESCRIPTION OF THE DRAWINGS

Further features and advantages of the present invention will become more evident in the indicative description below, and therefore non-limiting, of an embodiment but not exclusive of an oven for cooking food, as shown in the attached drawings in which.

DETAILED DESCRIPTION OF PREFERRED EMBODIMENTS OF THE INVENTION

In the attached figures, reference numeral 1 generally refers to an oven for cooking food. The cooking oven 1 comprises an enclosure 20 which identifies a cooking compartment 2. The enclosure 20 comprises a bottom base, a top opposite to the base, two opposing side walls and a back wall. The cooking oven 1 also comprises a door 3, which is movable between an open position in which it permits access to the compartment 2, and a closed position in which it contributes to delimiting the compartment 2. The door 3 at least in the closed position extends substantially vertically. The door 3 in the closed position is opposite to said back wall.

The door 3 comprises: a first panel 4 which, in the closing configuration of the door 3 contributes to delimiting said compartment 2; a second panel 5 which, in the closed configuration of the door 3 is at a greater distance from said compartment 2 than the first panel 4. Typically the second panel 5 is directly accessible from the outside of the oven 1 even with the door 3 closed.

Conveniently, the first and the second panel 4 and 5 are substantially parallel. Both the first and the second panel 4, 5 are at least partially transparent. Typically they are made of glass. In this way even with the door 3 closed they allow to look inside the compartment 2.

Between the first and second panel 4, 5 is usually present a gap 50. This gap 50 preferably defines a channel for the passage of a cooling flow. In this way the temperature reached by the second panel 5 during the operation of the oven 1 is reduced (thus decreasing the risk of burns to the user that could accidentally touch the second panel 5). The gap 50 could be bounded directly from the first and second panel 4, 5 or could be interposed between them.

Conveniently between the first and second panel 4, 5 could be interposed at least one intermediate panel 51. The eventual intermediate panel 51 helps to reduce the temperature of the second panel 5 during the operation of the oven 1.

Conveniently the door 3 comprises a first and a second body 6, 7 for supporting the first and second panel 4, 5. The first and the second bodies 6 and 7 selectively support the first and the second panel 4, 5 directly or indirectly (through the interposition of intermediate elements). In any case, the first and the second bodies 6, 7 support the weight of the first and second panels 4, 5. The first and second bodies 6, 7 have a preponderant longitudinal extension.

The first and second bodies 6 and 7, therefore, extend along its own predominant extensive direction. Conveniently, the first and the second bodies 6, 7 are parallel. In the attached figures, the first and the second bodies 6, 7 define uprights. First and second bodies 6, 7 can be a single body or an assembly of more elements. The first and second bodies 6, 7 are interposed between the first panel 4 and the second panel 5.

The first and second bodies 6, 7 are hinged to said enclosure 20. Preferably the second panel 5 is connected to first and second bodies 6, 7 by adhesive means. The door 3 also comprises a profile 8, which is movable between a first position in which it contributes to retaining the first panel 4 in position and a second position in which it permits the removal of the first panel 4 from the door 3. Therefore, during the normal operation of the oven 1 the profile 8 is in the first position whereas it is placed in the second position to allow the removal of the first panel 4 in order to support cleaning or replacement. Profile 8 is placed in the second position also in order to support cleaning or replacement of portions of the door 3, otherwise not accessible by an operator.

At least in the first position said profile 8 extends preponderantly along a side of said first panel 4 (along this extension profile 8 preferably alternates areas 810 where it is in contact with the first panel 4 and areas 811 where it is not in contact with the first panel 4).

At least in the first position, the profile 8 extends in a direction that is transverse to the preponderant extension of the first and second bodies 6, 7. Typically the first panel 4 has a rectangular shape. Advantageously, but not necessarily, the profile 8 extends along the longest side of said rectangle. Typically, the profile 8 extends along at least a part of the upper side of said rectangle (in order to estimate which is the upper side, the door 3 must be considered in the closed position).

The door 3 further comprises connection means 9 of the push-push type for connecting the profile 8 to remaining portions of the door 3 (remaining portions of the door 3 means at least a part of the door 3 distinct from profile 8). The push-push type connection means 9 as such are well known.

The push-push type connection means 9 comprise a first push-push connector 91 in turn comprising a first element 911 incorporated in or constrained to the profile 8 and a second element 912 constrained to the first body 6. In this embodiment the first element 911 is in a single body with profile 8.

In a first operating mode the first and second elements 911, 912 are reciprocally coupled and in a second operating mode the first and second elements 911, 912 are uncoupled.

The first and second elements 911, 912 are a male component and a female component. The first push-push connector 91 has two stable positions which correspond to the first and the second operating mode. To move from the second operating mode to the first operating mode, the male component is introduced making or applying a pressure in the female component along an insertion direction, up to the reaching of one of said two stable positions. To move from the first to the second operating mode, a pressure is applied according to or along said insertion direction that unlocks said male component from said female component.

The push-push type connection means 9 comprise a second push-push connector 92. The second push-push connector 92 comprises a first component 921 incorporated in or constrained to profile 8 and a second component 922 constrained to the first body 6. In this regard, the first and the second push-push connectors 91, 92 are arranged symmetrically to a vertical plane interposed between them and orthogonal to the first panel 4.

Conveniently, the operation of the first and second push-push connectors 91, 92 is substantially the same. In particular what has been described with reference to the first and second element 911, 912 may be repeated respectively for the first and the second component 921, 922. The user, by acting with only one hand on the profile 8 can activate simultaneously both the first push-push connector 91 and the second push-push connector 92.

In the first operating mode the first and second components 921, 922 are mutually coupled and in said second operating mode the first and second components 921, 922 are uncoupled. In this way a pressure on the profile 8 directed toward the gap 50 corresponds to a locking of the profile 8, and a subsequent pressure on profile 8 directed toward the gap 50 corresponds to an unlocking of profile 8.

By way of example, but not limiting example, the first and the second push-push connectors 91, 92 can be push-push connectors PR261.S01 marketed by the company Illinois Tool Works Inc.

Advantageously the oven 1 comprises: a first hinge 60 located at a first end 61 of the first body 6; a second hinge 70 located at a first end 71 of the second body 7. The first and second hinges 60, 70 permit the movement (to be tipped) of the door 3 relative to the remaining parts of the oven 1 (in particular relative to the enclosure 20). This allows the opening and closing of the door 3.

In the illustrative embodiment shown in the attached figures, the door 3 rotates around a horizontal axis. In an alternative embodiment not shown, the door 3 could, however, rotate around a vertical axis (in this case, the first and second bodies 6 and 7 would extend horizontally). Profile 8 in the first position connects a second end 62 of the first body 6 and a second end 72 of the second body 7.

The first body 6 comprises a housing cavity 63 of the second element 912 of the first push-push connector 91. Similarly, the second body 7 comprises a housing cavity of the second component 922.

The profile 8 comprises an edge 80 for holding the first panel 4. In said first position this edge 80 prevents the first panel 4 from moving away from the second panel 5. The retaining edge 80 performs a retaining action on an upper portion 40 of the first panel 4, said upper portion 40 being considered with reference to the door 3 in the closing position.

Referring to the closing position of the door 3, upper portion of the first panel 4 refers to a part of the first panel 4 extending vertically to 10 centimeters.

Conveniently the door 3 comprises means 73 for retaining the first panel 4 operating on a lower portion of said first panel 4, said lower portion being considered with reference to a closing position of the door 3. The means 73 for retaining the first panel 4 comprises, for example, a first bracket 74 which extends projecting from the first body 6.

In the closing position of the door 3, the first bracket 74 comprises a first part which extends away from the first body 6 and a second part that extends upward from the first part. The first bracket 74 therefore has an "L" structure.

The means 73 for retaining the first panel 4 comprises a second bracket 75 which extends to projecting from the second body 7. In the closed position of the door 3 the second bracket 75 comprises a first part which extends away from the second body 7 and a second part that extends upward from the first section of the second bracket. The second bracket 75 therefore has an "L" structure.

Profile 8 comprises a first portion 81 that in the first position, and with the door 3 in the closed position, occludes at the upper side, at least in part, a space interposed between the first and the second panels 4, 5.

In particular, the first portion 81 at least partially occludes said gap 50. The first portion 81 may comprise one or more openings that allow the passage of the cooling flow passing through said gap 50. Conveniently, the first element 911 and the first component 921 extend projecting from said first portion 81. With reference to the attached figures, when the door 3 is in the closed position, advantageously, the first element 911 and the first component 921 extend downwards from the first portion 81. Conveniently in the closed position of the door 3, the first and the second bodies 6, 7 extend vertically. The first and second bodies 6, 7 can have a tubular shape and respectively can accommodate within them said second element 912 and said second component 922.

Figure 1:
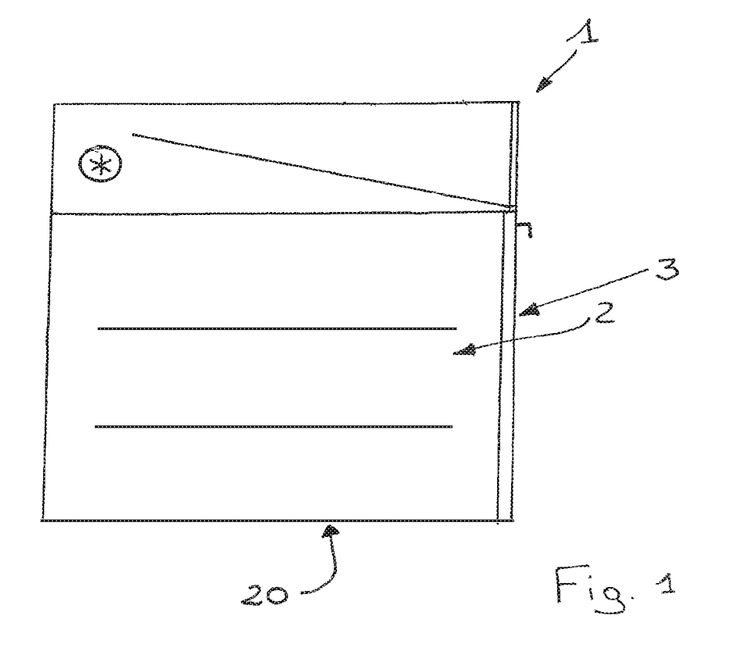
FIG. 1 shows a schematic view of a cooking oven according to the present invention.
Figure 2:
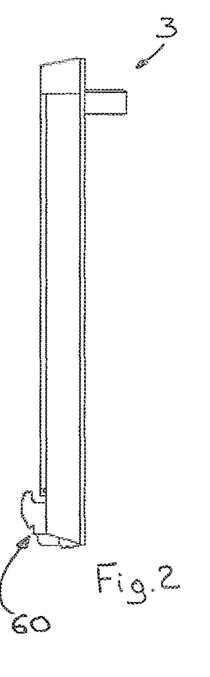
FIGS. 2 and 3 show two orthogonal views of a cooking oven door according to the present invention.
Figure 3:
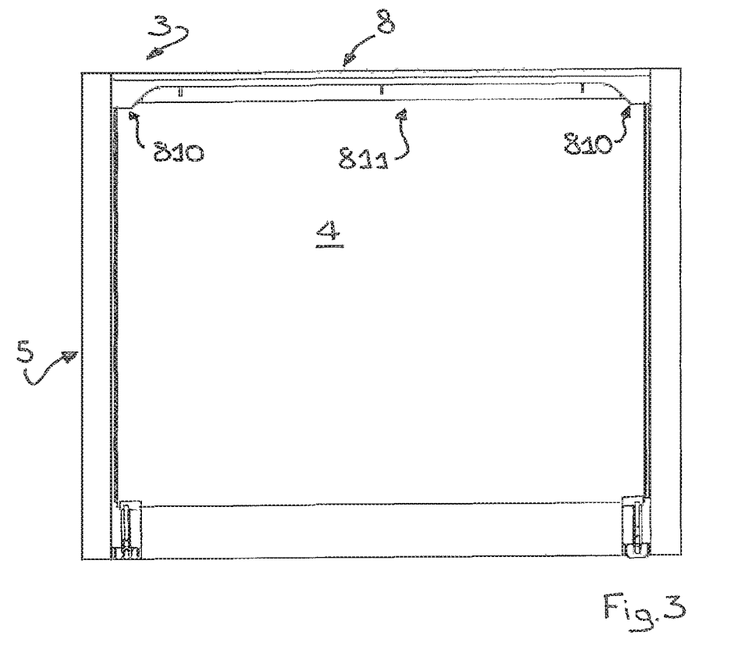
Figure 4:
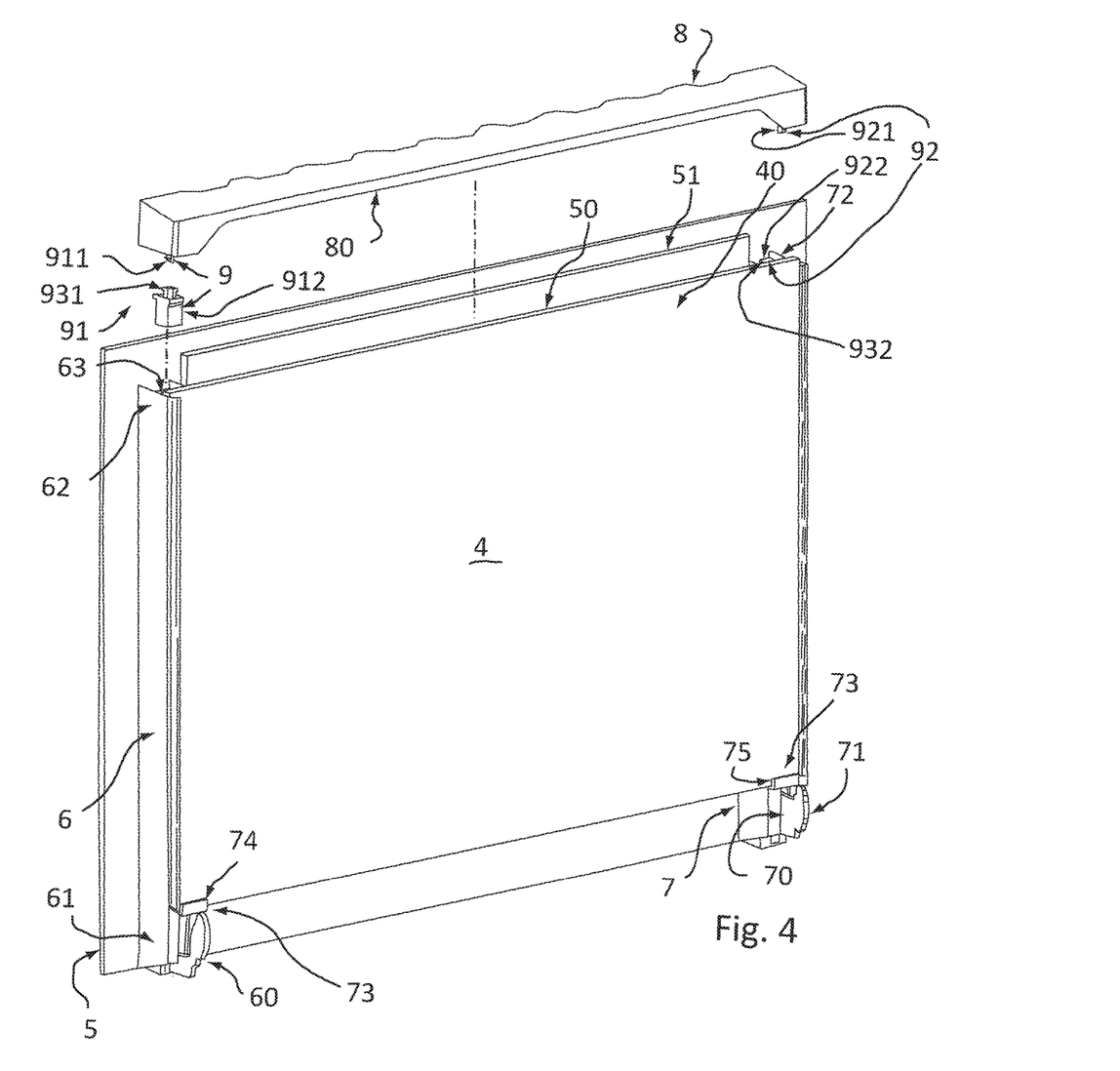
FIG. 4 shows an exploded view of the door of FIGS. 2 and 3.

In the exemplified embodiment in FIGS. 2-4, profile 8 is removable from the door 3. In particular, once the push-push type connection means 9 is disconnected, the profile 8 can be completely removed.

Figures 5, 6:
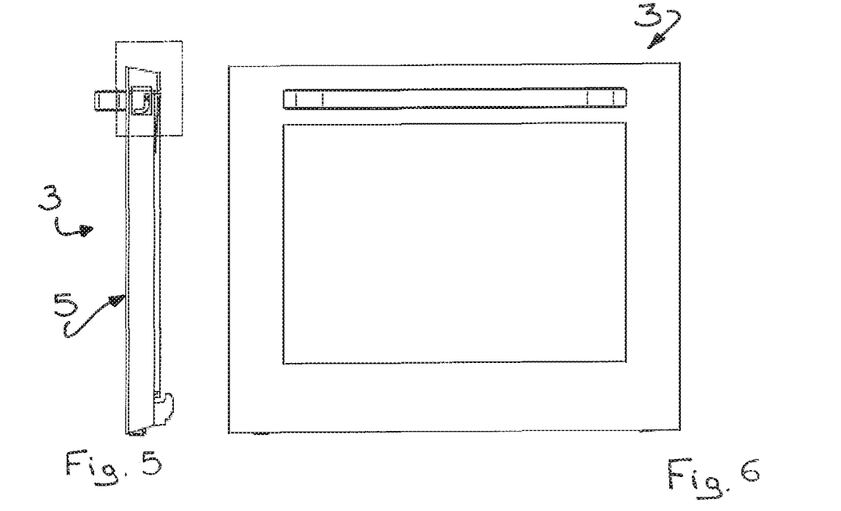
FIG. 5 shows a first orthogonal view of a further solution of a cooking oven according to the present invention.
FIG. 6 shows a second orthogonal view of a further solution of a cooking oven according to the present invention.
Figure 5A:
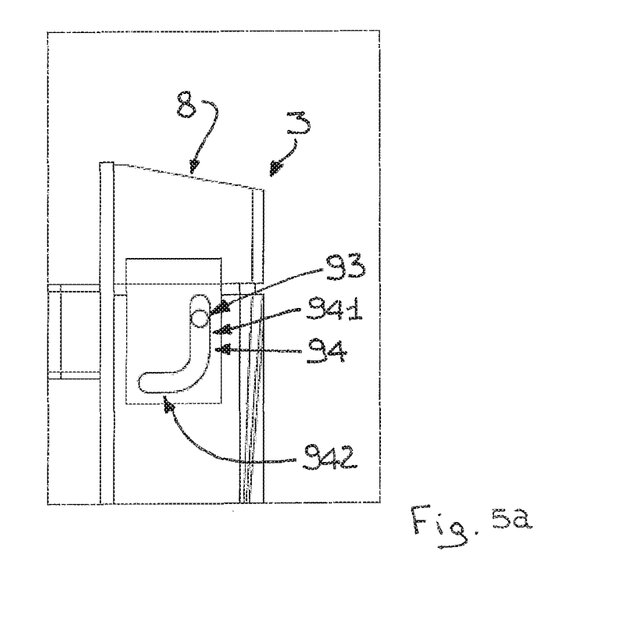
FIG. 5A shows a detail of FIG. 5.
Figure 7:
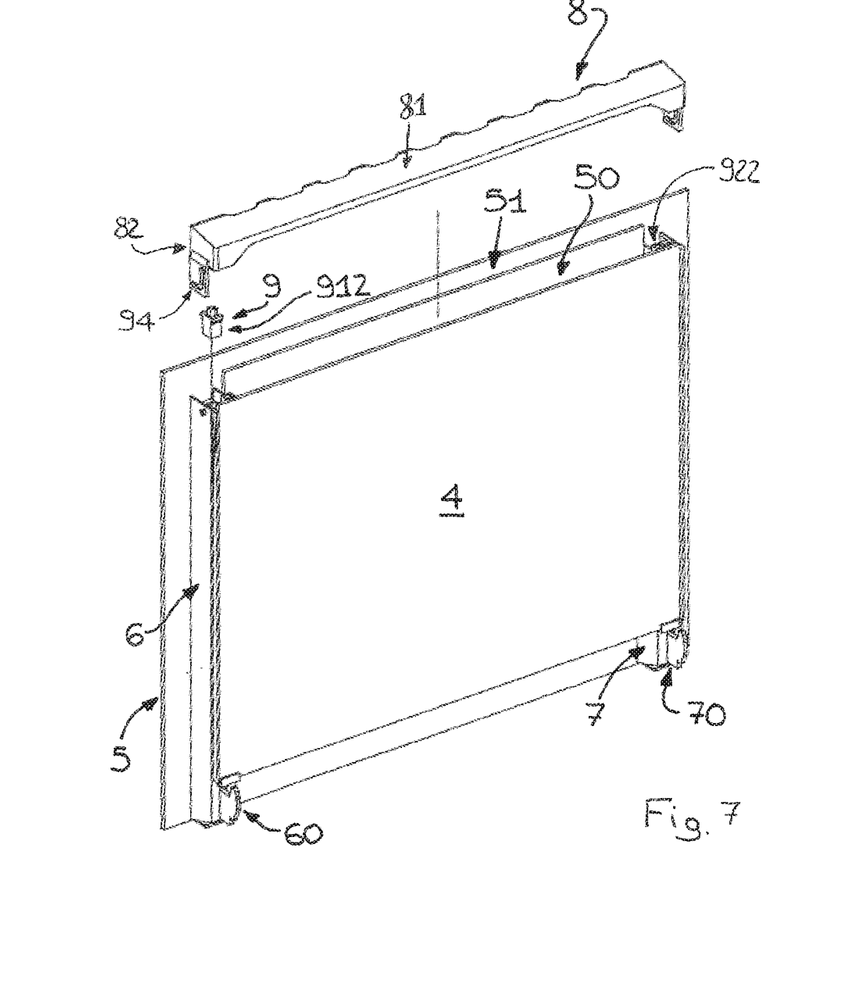
FIG. 7 shows an exploded view of the door of FIGS. 5A and 6.

Now as an example, but not a limiting example, refer to FIGS. 5-7. In this embodiment the profile 8 and the first body 6 comprise a first protrusion 93 and a first groove 94 in which the first protrusion 93 is inserted and along which the first protrusion 93 may slide. This means that: the first protrusion 93 is part of the profile 8 and the first groove 94 is part of the first body 6; or vice versa the first protrusion 93 is part of the first body 6 and the first groove 94 is part of the profile 8.

The first protrusion 93 could also rotate inside the first groove 94 to permit the profile 8 to be tipped. In this way the first protrusion 93 advantageously defines a pivot. Preferably this pivot is cylindrically shaped. The first groove 94 extends orthogonally to a rotation axis defined from the pivot. When the first and the second connector 91, 92 are set in the second operating mode the first portion 81 of the profile 8 can be moved out of a lying plane of the first panel 4, so as not to intersect the profile 8 with said plane (this lying plane is the plane defined by the first panel 4 when the first and the second connector 91, 92 are in said first operating mode). In this way, the profile 8 can remain connected to the door 8, but at the same time does not prevent with its presence the removal of the first panel 4. The first groove 94 advantageously extends parallel to a plane that is perpendicular to said lying plane of the first panel 4.

The first groove 94 comprises first and second parts 941, 942; in said closed position of the door 3 said first part 941 extending from a high point to a low point and said second part 942 being transverse to said first part 941. In particular, the second part 942 in the closed position of the door 3, connects to the lower area of the first part 941. Conveniently, the first and the second parts 941, 942 extend in "L" shape. The first and second parts 941, 942 are joined up (preferably by means of an arc of a circle). When the profile 8 is in the first position, the first protrusion 93 lies in the first part 941. Profile 8 is removed from the first panel 4 by moving the first protrusion 93 first along the first part 941 and subsequently by moving the first protrusion 93 along the second part 942.

Profile 8 and the second body 7 comprise a second protrusion and a second groove in which the second protrusion is inserted and along which the second protrusion can slide. Preferably the first and the second protrusions are symmetrical to an imaginary symmetrical plane.

Conveniently, the first and the second grooves are symmetrical to the same plane of symmetry. What has been described with reference to the interaction between the first protrusion 93 and the first groove 94 may be repeated for the interaction between the second protrusion and the second groove.

The door 3 therefore comprises means for connecting the profile 8 to the first and/or to the second body 6, 7. The connection means are not removable connection means. These connection means comprise therefore the first protrusion 93 and the first groove 94. Conveniently the connection means also comprise the second protrusion and the second groove.

Conveniently, the first protrusion 93 extends from the first body 6. In addition to the first portion 81 described above, the profile 8 comprises a second portion 82 which is transverse to the first portion 81 and that at least in the first position of the profile 8 overlaps the first body 6; the first groove 94 is formed in said second portion 82.

Additionally, a method for removing the first panel 4 from an oven 1 having one or more of the features described above is also disclosed. This method for removing comprises the steps of: releasing the connection means 9 of the push-push type; sliding the first panel 4 from remaining parts of the door 3.

The step of releasing the connection means 9 of the push-push type comprises the steps of: applying a disconnection pressure, which causes the profile 8 to move toward the first panel 4 of the door 3; releasing profile 8 causing the movement of the profile 8 from the first panel 4.

More in particular, an object of the present invention is a method for removing and/or repositioning the first panel 4 of an oven having one or more of the characteristics described above. In particular the removal of the first panel 4 comprises the steps of: I) removing the profile 8 from said first position by releasing the connection means 9 of the push-push type; II) sliding the first panel 4 from remaining parts of the door 3.

The step of releasing the connection means 9 of the push-push type comprises the steps of applying a disconnection pressure, which causes the profile 8 to move toward the first panel 4; the movement of the profile 8 toward the first panel 4 pushing the first element 911 and the first component 921 respectively on the second element 912 and on the second component 922. This push causes an opening of a first and a second pair of jaws 931, 932 belonging respectively to the second element 912 and the second component 922. As indicated previously, the first element 911 and the first component 921 are male elements which perform the action of pushing respectively in correspondence of the junction region of the clamps of the second element 912 and the second component 922 (these jaws 931, 932 define then female elements with which the first element 911 and the first component 921 interact). The first and second pair of jaws 931, 932 in said first position perform a retaining action respectively on the first element 911 and on the first component 921.

The opening of the first pair of jaws 931 permits then the first element 911 to be freed from the grip of the second element 912. Similarly the opening of the second pair of jaws 932 enables the first component 921 to be freed from the grip of the second component 922.

Although previously it has been made reference to a situation in which both the first and the second connectors 91, 92 interact, the latter could also be absent. For example in the embodiment of FIGS. 5-7 the removal of the first panel 4 also comprises the step of moving the profile 8 by initially sliding the first protrusion 93 along the first part 941 of the first groove and subsequently along the second part 942 of the first groove 94. The method also comprises the step of tipping of the profile 8 by rotating it around the said pivot defined by the first protrusion 93. This tipping step typically occurs when the first protrusion 93 is in the second part 942. Conveniently, the tipping step of the profile 8 allows for placement of the profile 8 opposite to the second panel 5 (in a position out of the space that does not block the removal of the first panel). The moving of the first protrusion 93 along the first part 941 of the first groove 94 allows the movement of the profile 8, which is to disengage from the first panel 4. The moving of the first protrusion 93 along the second part 942 of the first groove 94 allows for removal of the profile 8 by the second panel 5 so as to allow the subsequent tipping of profile 8 (alternatively, the second panel 5 would find just the profile 8, preventing the positioning of the profile 8 opposite to the second panel 5). As already mentioned above, what has been described with reference to the movement of the first protrusion 93 along the first groove 94 may be repeated for the movement of the second protrusion along the second groove (this allows to move the profile 8 while maintaining substantially horizontal its preponderant development direction).

The repositioning of the first panel 4 includes the steps of:
I) applying the first panel 4 to the remaining parts of said door 3 by inserting it in support means obtained in said door 3;
II) positioning the profile 8 in said first position by connecting push-push connection means 9.

The step of positioning the profile 8 in said first position by connecting push-push connection means 9 comprises the steps of:
  positioning said first and said second elements 911, 912 of the first connector 91 opposite each other;
  positioning said first and said second components 921, 922 of the second connector 92 opposite each other;
  applying a connection pressure which pushes said profile 8 toward the first panel 4 of the door 3; in this case, the connection pressure and disconnection pressure are oriented along the same direction relative to the door 3.

The movement of the profile 8 toward the first panel 4 determines a pushing of the first element 911 and the first component 921 respectively on the second element 912 and the second component 922. This pushing causes a movement of the first and second pair of jaws 931, 932; during this movement, the first and the second pair of jaws 931, 932 are in contact with the matching parts that determine their closing; in this way, the first and the second pair of jaws 931, 932 grip respectively the first and second element 911, 912.

The present invention allows to achieve multiple advantages. First of all, it allows a fast passage of profile 8 from said first to said second position and vice versa. In addition, the profile 8 is easily accessible to the user and this allows to make extremely convenient the cleaning operation of the door of the oven. In addition, a further important advantage is related to the fact that the removal and installation of the first panel 4 may take place without the aid of tools.

The invention thus conceived is susceptible to numerous modifications and variations, all of which are within the scope of the invention that characterized it. In addition, all the details can be replaced by other elements technically equivalent, in practice, all the used materials, as well as the dimensions, may be any, depending on requirements.

What is claimed is:
1. An operable door for a cooking appliance, the operable door comprising:
  inner and outer panels;
  first and second bodies that include respective first and second brackets for retaining an edge of the inner panel against the first and second bodies;
  a profile selectively movable between a first position that retains the inner panel against the first and second bodies, and a second position that permits selective and slidable removal of the inner panel from the first and second bodies, wherein the profile in at least the first position extends preponderantly along a side of the inner panel and along a direction that is transverse to a preponderant longitudinal extension of the first and second bodies; and
  a connector of a push-push type having a latched position and an unlatched position, wherein the connector is configured to retain the profile to the first and second bodies when the connector is in the latched position and wherein the profile is movable to the second position when the connector is in the unlatched position, and wherein either the profile or the first body includes a first protrusion and the other includes a first groove in which the first protrusion is inserted and along which the first protrusion can slide.

2. The operable door of claim 1, wherein the inner panel is removable from the first and second bodies by sliding the inner panel along the first and second bodies in a direction parallel to the preponderant longitudinal extension when the profile is in the second position.

3. The operable door of claim 2, wherein the profile remains attached to the first and second bodies in each of the first and second positions.

4. The operable door according to claim 2, wherein the first and second bodies are two parallel uprights.

5. The operable door according to claim 1, wherein the connector includes a first element coupled to the profile and a second element coupled to the first body.

6. The operable door according to claim 5, wherein the first body includes a cavity for receiving the second element.

7. The operable door according to claim 5, further comprising:
  a second connector that includes a first component coupled with the profile and a second component coupled with the second body.

8. The operable door according to claim 1, wherein the first protrusion can rotate inside the first groove to permit the profile to be tipped or angled as it passes from the first to the second position.

9. The operable door according to claim 1, wherein the first protrusion extends from the first body.

10. A cooking appliance comprising:
  an enclosure that defines a cooking compartment;
  a door operable between open and closed positions with respect to the cooking compartment, the door comprising:
    an inner panel that partially defines the cooking compartment when the door is in the closed position;
    an outer panel that opposes the inner panel;
    first and second bodies that support the inner and outer panels, wherein the first and second bodies are hingedly coupled to the enclosure;
    first and second brackets that selectively retain an edge of the inner panel against the first and second bodies;
    a profile that is selectively operable between a first position that secures the edge of the inner panel with respect to the first and second bodies, and a second position that permits slidable removal of the inner panel from the first and second bodies; and a connector of a push-push type that defines latched and unlatched positions, wherein the connector in the latched position secures the profile in the first position, and wherein the profile is movable to the second position when the connector is in the unlatched position, wherein the inner panel is removable from the door by sliding the inner panel along the first and second bodies in a direction parrallel to a preponderant longitudinal extension of the first and second bodies when the profile is in the second position, and wherein at least in the first position of the profile, the profile extends preponderantly along a side of the inner panel and along a direction that is transverse to the preponderant longitudinal extension of the first and second bodies.

11. The cooking appliance of claim 10, wherein the profile remains attached to the first and second bodies in each of the first and second positions.

12. The cooking appliance according to claim 10, further comprising:

a first hinge located at a first end of the first body; and a second hinge located at a first end of the second body, wherein the first and second hinges define rotational operation of the door relative to the enclosure, and wherein the profile in the first position is connected to each of the first and second bodies.

13. The cooking appliance according to claim 10, wherein the profile includes:

a first portion that, in the first position, extends between the inner and outer panels; and a second portion that is transverse to the first portion and overlaps the first body in the first position.

14. The cooking appliance according to claim 10, wherein at least one of the profile and the first body include a first protrusion and the other of the profile and the first body includes a first groove, wherein the first protrusion is adapted to slide along the first groove.

* * * * *